United States Patent
Miyasaka et al.

(10) Patent No.: US 10,196,304 B2
(45) Date of Patent: Feb. 5, 2019

(54) GLASS AND CHEMICALLY TOUGHENED GLASS USING SAME

(71) Applicant: ASAHI GLASS COMPANY, LIMITED, Chiyoda-ku (JP)

(72) Inventors: Junko Miyasaka, Tokyo (JP); Seiki Ohara, Tokyo (JP)

(73) Assignee: AGC Inc., Chiyoda-ku (JP)

(*) Notice: Subject to any disclaimer, the term of this patent is extended or adjusted under 35 U.S.C. 154(b) by 0 days.

(21) Appl. No.: 15/385,428

(22) Filed: Dec. 20, 2016

(65) Prior Publication Data
US 2017/0121220 A1 May 4, 2017

Related U.S. Application Data

(63) Continuation of application No. PCT/JP2015/068250, filed on Jun. 24, 2015.

(30) Foreign Application Priority Data

Jun. 27, 2014 (JP) .................... 2014-132551

(51) Int. Cl.
*C03C 3/087* (2006.01)
*C03C 21/00* (2006.01)
*C03C 3/091* (2006.01)

(52) U.S. Cl.
CPC ............ *C03C 21/001* (2013.01); *C03C 3/087* (2013.01); *C03C 3/091* (2013.01); *C03C 21/00* (2013.01)

(58) Field of Classification Search
CPC ......... C03C 3/085; C03C 3/087; C03C 3/078; C03C 21/002
See application file for complete search history.

(56) References Cited

U.S. PATENT DOCUMENTS 6,518,211 B1* 2/2003 Bradshaw ............... C03C 3/085
428/410
2009/0197088 A1* 8/2009 Murata ................... C03C 3/083
428/410

(Continued)

FOREIGN PATENT DOCUMENTS

EP 2 634 150 A1 9/2013
JP 2012-184118 9/2012

(Continued)

OTHER PUBLICATIONS

International Search Report dated Sep. 15, 2015 in PCT/JP2015/068250, filed on Jun. 24, 2015 (with English Translation).

(Continued)

*Primary Examiner* — Noah S Wiese
(74) *Attorney, Agent, or Firm* — Oblon, McClelland, Maier & Neustadt, L.L.P.

(57) ABSTRACT

An object is to provide a glass for chemical toughening treatment satisfying low brittleness, low melt viscosity and high chemical toughening characteristics, and a chemically toughened glass using the same. Provided is a glass for chemical toughening treatment containing, in mass % in terms of oxides, $SiO_2$ 63 to 76, $B_2O_3$ 0 to 2, $Al_2O_3$ 2 to 10, MgO 2 to 12, CaO 0.1 to 8, $Na_2O$ 14.5 to 19, $K_2O$ 0 to 3, and $Fe_2O_3$ 0 to 0.5, satisfying a total content of alkali earth metal oxides (RO) being from 5 to 15, satisfying 15×MgO/RO−RO≥3, and having a temperature $T_2$ at which a glass viscosity reaches $10^2$ dPa·s being 1,600° C. or lower.

16 Claims, 1 Drawing Sheet

(56) References Cited

U.S. PATENT DOCUMENTS

| | | | | |
|---|---|---|---|---|
| 2010/0255350 A1* | 10/2010 | Endo | ................ | C03C 3/085 |
| | | | | 428/846.9 |
| 2011/0091704 A1* | 4/2011 | Akiba | ................ | C03C 3/087 |
| | | | | 428/220 |
| 2012/0052275 A1* | 3/2012 | Hashimoto | ........... | C03C 3/087 |
| | | | | 428/215 |
| 2012/0297829 A1* | 11/2012 | Endo | ................ | C03C 3/085 |
| | | | | 65/30.14 |
| 2013/0224491 A1 | 8/2013 | Smedskjaer et al. | | |
| 2013/0267402 A1* | 10/2013 | Nishizawa | ............ | C03C 3/085 |
| | | | | 501/66 |
| 2013/0302618 A1* | 11/2013 | Kuhnemann | .......... | C03C 3/087 |
| | | | | 428/410 |
| 2015/0175473 A1 | 6/2015 | Yamamoto et al. | | |

FOREIGN PATENT DOCUMENTS

| | | |
|---|---|---|
| JP | 2013-193887 | 9/2013 |
| JP | 2014-506553 | 3/2014 |
| WO | WO 99/48824 A1 | 9/1999 |
| WO | WO 2014/042175 A1 | 3/2014 |

OTHER PUBLICATIONS

Written Opinion dated Sep. 15, 2015 in PCT/JP20151068250, filed on Jun. 24, 2015.

Supplementary European Search Report dated Dec. 12, 2017 in corresponding European Patent Application No. 15811886.9.

* cited by examiner

[FIG. 1]
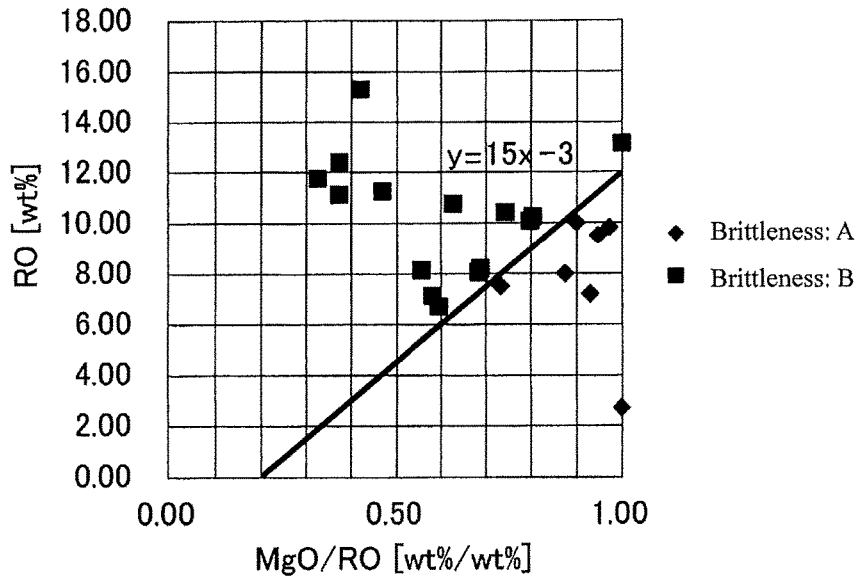
[FIG. 2]
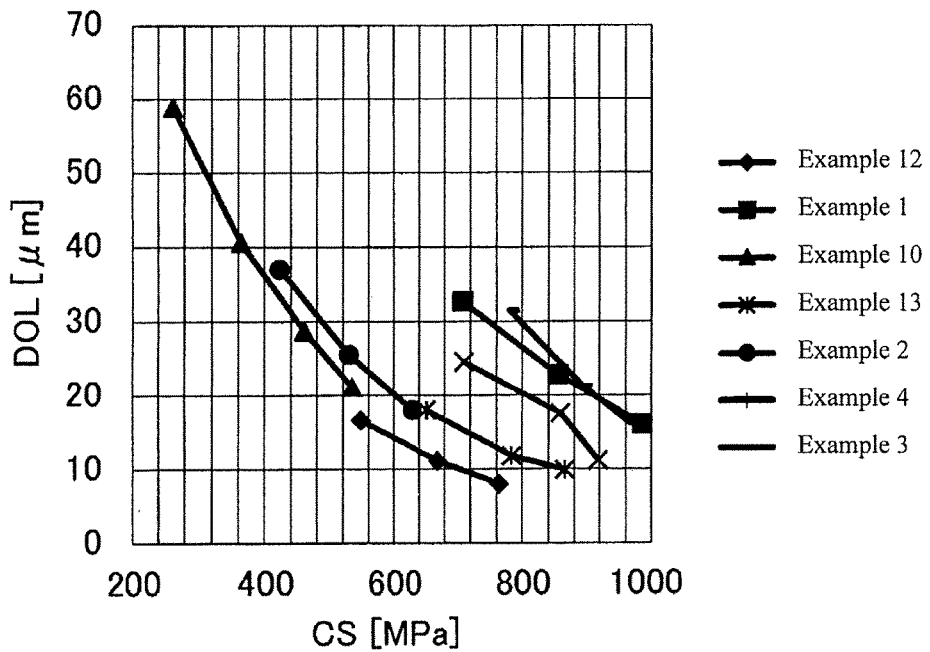

GLASS AND CHEMICALLY TOUGHENED GLASS USING SAME

TECHNICAL FIELD

The present invention relates to glass suited for chemical toughening treatments.

The present invention also relates to chemically toughened glass using such glass.

BACKGROUND ART

Display devices equipped with display means such as liquid crystal members and LED members are in wide use as, for example, small and/or portable display devices such as electronic notebooks, laptop personal computers, tablet PCs, and smartphones. For protection of these display devices, cover glass is provided on the surface of these display devices.

Display devices, particularly portable display devices have a relatively higher chance of being accidentally dropped by a user during use or during carrying. This has created a need for a cover glass having high-strength that can avoid damages on the cover glass even when the display device is dropped.

The recent trend for higher-resolution display devices also requires the cover glass to provide high visibility for display image so that the high resolution properties will not be impaired.

One way of increasing the strength of a cover glass is to carry out a chemical toughening treatment on the cover glass.

Commonly known soda lime silicate glass involves problems in that it has slow ion exchange rates and thus is not sufficient in terms of the depth of the surface compressional stress layer (DOL) formed by chemical toughening treatment, and that this type of glass also has high brittleness and thus cracking tends to occur during handling.

In order to solve these problems, the present applicant has provided the glass for chemical toughening described in Patent Document 1. This glass for chemical toughening has a high ion exchange rate, and thus the depth of the surface compressional stress layer (DOL) formed by chemical toughening treatment is sufficient. The glass also has low brittleness, and cracking is unlikely to occur during handling.

However, the glass for chemical toughening described in Patent Document 1 involves problems in that it has poor productivity because of high melt viscosity, that it has a low glass transition point (Tg) causing stress relaxation during the chemical toughening treatment, and thus a high surface compressional stress (CS) cannot be attained.

PRIOR ART DOCUMENTS

Patent Document

[Patent Document 1] JP-A-2012-184118

SUMMARY OF THE INVENTION

Problems that the Invention is to Solve

In order to solve the problems of the related art, an object of the present invention is to provide a glass for chemical toughening treatment that satisfies low brittleness, low melt viscosity and high chemical toughening characteristics, and a chemically toughened glass using the same.

Means for Solving the Problems

In order to achieve the foregoing objects, the present invention provides a glass for chemical toughening treatment containing, in mass % in terms of oxides, $SiO_2$ 63 to 76,
$B_2O_3$ 0 to 2,
$Al_2O_3$ 2 to 10,
$MgO$ 2 to 12,
$CaO$ 0.1 to 8,
$Na_2O$ 14.5 to 19,
$K_2O$ 0 to 3, and
$Fe_2O_3$ 0 to 0.5,
satisfying a total content (RO) of alkali earth metal oxides being from 5 to 15,
satisfying $15 \times MgO/RO - RO \geq 3$, and
having a temperature $T_2$ at which a glass viscosity reaches $10^2$ dPa·s being 1,600° C. or lower.

It is preferable in the glass for chemical toughening treatment of the present invention that MgO/RO is 0.5 or more.

It is preferable in the glass for chemical toughening treatment of the present invention to satisfy, in mass % in terms of an oxide, $SiO_2$ 63 to 73,
$Al_2O_3$ 2 to 7,
$MgO$ 6 to 10, and
$CaO$ 0.3 to 5.

The present invention also provides a chemically toughened glass in which a chemical toughening treatment is carried out on at least one principal surface of the glass for chemical toughening treatment of the present invention.

It is preferable in the chemically toughened glass of the present invention that the principal surface subjected to the chemical toughening treatment has a depth of surface compressional stress layer (DOL) of 8 μm or more, and a surface compressional stress (CS) of 300 MPa or more.

It is preferable in the chemically toughened glass of the present invention that the principal surface subjected to the chemical toughening treatment has a depth of surface compressional stress layer (DOL) of 20 μm or more, and a surface compressional stress (CS) of 550 MPa or more.

Advantageous Effects of the Invention

The glass for chemical toughening treatment according to the present invention has a temperature $T_2$ at which a glass viscosity reaches $10^2$ dPa·s being low as 1,600° C. or lower. Accordingly, the glass has excellent meltability and high productivity.

The glass for chemical toughening treatment according to the present invention also has low brittleness, and thus cracking is unlikely to occur during handling.

The glass for chemical toughening treatment according to the present invention has a high ion exchange rate, and thus the depth (DOL) of the surface compressional stress layer formed by chemical toughening treatment is sufficient as 8 μm or more. In addition, the chemical toughening treatment provides a high surface compressional stress (CS) as 300 MPa or more.

BRIEF DESCRIPTION OF THE DRAWINGS

FIG. 1 is a graph showing the relationship between MgO/RO and RO, and the relationship with the results of brittleness evaluation in Examples.

FIG. 2 is a graph showing the relationship between CS and DOL in Examples.

MODE FOR CARRYING OUT THE INVENTION

The glass for chemical toughening treatment and the chemically toughened glass according to the present invention are described below.

The content range of each component of the glass for chemical toughening treatment according to the present invention is described below.

It is to be noted that "%" representing the content of each component of the glass for chemical toughening treatment of the present invention means "mass %" in terms of an oxide, unless otherwise specifically stated. As used in the present specification, "mass %" and "weight %" have the same meaning.

$SiO_2$ is known as a component forming a network structure in a glass microstructure, and represents the main constituent component of the glass.

The $SiO_2$ content is from 63 to 76%. The lower limit is preferably 64% or more, more preferably 65% or more, further preferably 66% or more, even more preferably 67% or more, and particularly preferably 68% or more. The upper limit of $SiO_2$ content is preferably 75% or less, more preferably 74% or less, and further preferably 73% or less. An $SiO_2$ content of 63% or more is advantageous in terms of glass stability and weather resistance. On the other hand, an $SiO_2$ content of 76% or less is advantageous in terms of meltability and formability.

$B_2O_3$ may be contained in a range of 2% or less because it provides excellent meltability at high temperature, and can prevent increase of the temperature $T_2$ at which a glass viscosity reaches $10^2$ dPa·s. In order to obtain these effects, the $B_2O_3$ content is preferably 0.5% or more and more preferably 1% or more. In order to prevent composition changes due to evaporation of alkali borate compounds during melting, the $B_2O_3$ content is preferably 1% or less and more preferably 0.5% or less, and further preferably it is not substantially contained. Here and below, "not substantially contained" means that it is not contained except for inclusion of unavoidable impurities from raw materials or the like. In other words, it means that it is not intentionally contained. The same applies hereafter.

$Al_2O_3$ has a function of improving ion-exchangeability in chemical toughening treatment, and in particular has a large function of improving the surface compressional stress (CS). It is also known as a component improving the weather resistance of glass.

The $Al_2O_3$ content is from 2 to 10%. The lower limit is preferably 2.5% or more, more preferably 3% or more, further preferably 3.5% or more, even more preferably 4% or more, yet more preferably 4.5% or more, still more preferably 5% or more, and particularly preferably 5.5% or more. The upper limit of $Al_2O_3$ content is preferably 9.5% or less, more preferably 9% or less, further preferably 8.5% or less, even more preferably 8% or less, yet more preferably 7.5% or less, and particularly preferably 7% or less.

With an $Al_2O_3$ content of 2% or more, the desired value of surface compressional stress (CS) can be obtained through ion exchange, the effect of inhibiting entry of tin from the bottom surface during float forming can be exhibited, and the decrease in surface compressional stress (CS) can be prevented in a chemical toughening treatment of the bottom surface side at which it is in contact with tin. On the other hand, with an $Al_2O_3$ content of 10% or less, meltability at high temperature becomes excellent and the increase in temperature $T_2$ at which a glass viscosity reaches $10^2$ dPa·s can be prevented.

MgO is a component stabilizing glass, and is essential.

The MgO content is from 2 to 12%. The lower limit is preferably 2.5% or more, more preferably 3% or more, further preferably 3.5% or more, even more preferably 4% or more, yet more preferably 4.5% or more, and particularly preferably 5% or more. The upper limit of MgO content is preferably 11.5% or less, more preferably 11% or less, further preferably 10.5% or less, even more preferably 10% or less, yet more preferably 9.5% or less, and particularly preferably 9% or less. With an MgO content of 2% or more, meltability at high temperature becomes excellent and the increase in temperature $T_2$ at which a glass viscosity reaches $10^2$ dPa·s can be prevented. On the other hand, with a MgO content of 12% or less, unlikeliness of occurring devitrification can be maintained and a sufficient ion exchange rate can be achieved.

CaO is a component stabilizing glass, and is essential.

The CaO content is from 0.1 to 8%. The lower limit is preferably 0.3% or more, more preferably 0.5% or more and further preferably 1% or more. The upper limit of CaO content is preferably 6% or less, more preferably 5% or less, further preferably 2.5% or less, even more preferably 2% or less, and particularly preferably 1.5% or less. With a CaO content of 0.1% or more, meltability at high temperature becomes excellent and devitrification becomes unlikely to occur. On the other hand, with a CaO content of 8% or less, a sufficient ion exchange rate can be achieved, and a chemical toughening treatment layer of a desired thickness can be obtained. In the case where warping occurred due to chemical toughening treatment needs to be prevented by reducing the coefficient of linear thermal expansion (CTE) in particular, the upper limit of CaO content is preferably 5% or less, more preferably 3% or less, further preferably 1% or less, and particularly preferably less than 1%.

$Na_2O$ is an essential component that forms a chemical toughening treatment layer through ion exchange. It is a component also lowering the high-temperature viscosity and devitrification temperature of the glass, and improving the meltability and formability of the glass.

The $Na_2O$ content is from 14.5 to 19%. The lower limit is preferably 15% or more, more preferably 15.5% or more, and further preferably 16% or more. The upper limit of $Na_2O$ content is preferably 18.5% or less, more preferably 18% or less, further preferably 17.5% or less, and particularly preferably 17% or less. With a $Na_2O$ content of 14.5% or more, a desirable chemical toughening treatment layer can be formed by ion exchange and the surface compressional stress (CS) improves. On the other hand, with a $Na_2O$ content of 19% or less, sufficient weather resistance can be obtained, and the CTE does not become overly high and thus it is possible to make the glass after the chemical toughening treatment be unlikely to warp.

$K_2O$ has an effect of increasing the ion exchange rate and thickening the chemical toughening treatment layer, and thus, it may be contained in a range of 3% or less. In the case of 3% or less, a sufficient surface compressional stress can be obtained. Because $K_2O$ is a component increasing CTE, when $K_2O$ is contained, it is preferably 2.5% or less, more preferably 2% or less, further preferably 1.5% or less, even more preferably 1% or less, and yet more preferably 0.5% or less, and it is particularly preferably not substantially contained.

$Li_2O$ is a component that lowers the glass transition point Tg to promote stress relaxation and as a result, makes impossible to obtain a stable surface compressional stress layer. Therefore, it is preferable that it is not substantially contained. In the case of being contained, the content is preferably less than 2%, more preferably 1% or less, and particularly preferably less than 0.1%.

$Fe_2O_3$ is not an essential component but a component that is highly difficult to make the content zero because it exists everywhere from nature to production lines. It is known that $Fe_2O_3$ in the oxidized form becomes a cause of a yellow color, and FeO in the reduced form causes a blue color, and that they balance to make the glass green.

When used as a cover glass after a chemical toughening treatment, with an $Fe_2O_3$ content of 0.5% or less, the color appearance of the member placed below the cover glass does not change when observed through the cover glass. The $Fe_2O_3$ content is preferably 0.3% or less and more preferably 0.2% or less.

The total content of alkali earth metal oxides (MgO, CaO, SrO, BaO) (hereinafter, referred to as "RO") is from 5 to 15%. The lower limit is preferably 5.5% or more, more preferably 6% or more, further preferably 6.5% or more, even more preferably 7% or more, yet more preferably 7.5% or more, still more preferably 8% or more, further preferably 8.5% or more, and particularly preferably 9% or more. The upper limit of RO is preferably 14.5% or less, more preferably 14% or less, further preferably 13.5% or less, even more preferably 13% or less, yet more preferably 12.5% or less, and particularly preferably 12% or less.

With an RO of 5% or more, the increase in temperature $T_2$ at which a glass viscosity reaches $10^2$ dPa·s can be prevented. On the other hand, with an RO of 15% or less, the increase of devitrification temperature can be prevented.

The glass for chemical toughening treatment according to the present invention has the product of the following formula (1) constituted by MgO and RO in the glass components being 3 or more, and therefore the glass has low brittleness and cracking is unlikely to occur during handling.

$$15 \times MgO/RO - RO \quad (1)$$

The fact that the glass shows low brittleness when the product of the formula (1) is 3 or more is also evidenced by the Examples below.

In the glass for chemical toughening treatment according to the present invention, the product of the formula (1) is preferably 3.5 or more, more preferably 4 or more, further preferably 4.5 or more, and particularly preferably 5 or more.

In the glass for chemical toughening treatment according to the present invention, the product of the formula (1) is preferably 10 or less from the viewpoint of providing excellent meltability at high temperature and preventing the increase in temperature $T_2$ at which a glass viscosity reaches $10^2$ dPa·s. The product of the formula (1) is more preferably 9 or less, further preferably 8 or less, even more preferably 7 or less, yet more preferably 6.5 or less, and particularly preferably 6 or less.

In the glass for chemical toughening treatment according to the present invention, the proportion of MgO in the alkali earth metal oxides (hereinafter, referred to as "MgO/RO") is 0.5 or more, preferably 0.55 or more, more preferably 0.6 or more, further preferably 0.65 or more, even more preferably 0.7 or more, yet more preferably 0.75 or more, still more preferably 0.8 or more, further preferably 0.85 or more, and particularly preferably 0.9 or more.

With an MgO/RO of 0.5 or more, the ion exchange rate can be increased and the chemical toughening treatment layer can be made thick.

Though the glass for chemical toughening treatment according to the present invention is essentially made of the components described above, other components may also be contained within a range not impairing the purpose of the present invention. Examples of the other components are as follows.

Typically, $ZrO_2$ is known to have an effect of increasing surface compressional stress (CS) through chemical toughening treatment. However, the effect is not adequate for the increase of cost if $ZrO_2$ is added. Accordingly, $ZrO_2$ may be contained in any proportion as cost allows. In the case where $ZrO_2$ is contained, it is preferably 3% or less, more preferably 2.5% or less, further preferably 2% or less, even more preferably 1.5% or less, yet more preferably 1% or less, and particularly preferably 0.5% or less.

In addition, the glass for chemical toughening treatment according to the present invention also may contain, for example, color components such as Co, Cr and Mn, and other components such as Zn, Sr, Ba, Ti, Cl, F, and $SO_3$, in a total amount of 3% or less within a range not impairing the effect of the present invention.

The characteristics of the glass for chemical toughening treatment according to the present invention are described below.

From the viewpoint of providing excellent meltability at high temperature, the glass for chemical toughening treatment according to the present invention has a temperature $T_2$ at which a glass viscosity reaches $10^2$ dPa·s being 1,600° C. or lower. In the glass for chemical toughening treatment of the present invention, the temperature $T_2$ is preferably 1,570° C. or lower and more preferably 1,550° C. or lower.

Temperature $T_2$ can be measured by using a rotary viscometer or the like.

Since the glass for chemical toughening treatment according to the present invention has excellent meltability at high temperature, it is applicable to various manufacturing methods. For example, raw materials are blended so as to have a target composition according to an ordinary method, and heated to vitrify at 1,450 to 1,650° C. Subsequently, the molten glass is clarified and formed into the predetermined shape. In the case where the glass after a chemical toughening treatment is used in applications such as cover glass, it is shaped into a glass plate.

To be suitable for float forming, the glass for chemical toughening treatment according to the present invention has a temperature $T_4$ at which the glass viscosity reaches $10^4$ dPa·s being preferably 1,300° C. or lower. In the glass for chemical toughening treatment of the present invention, the temperature $T_4$ is more preferably 1,200° C. or lower and further preferably 1,150° C. or lower.

Temperature $T_4$ can be measured by using a rotary viscometer or the like.

The glass for chemical toughening treatment according to the present invention has a glass transition point (Tg) of preferably 520° C. or higher. The Tg of 520° C. or higher is advantageous in terms of inhibiting stress relaxation and inhibiting heat warpage during the chemical toughening treatment. For example, a high surface compressional stress (CS) can be obtained because stress relaxation is inhibited during the chemical toughening treatment. The Tg is more preferably 540° C. or higher, further preferably 550° C. or higher, and most preferably 560° C. or higher.

The glass for chemical toughening treatment according to the present invention has a coefficient of linear thermal expansion (CTE) of preferably $100 \times 10^{-7}$/° C. or less. With a CTE of $100 \times 10^{-7}$/° C. or less, the glass becomes unlikely to warp during the chemical toughening treatment. The CTE is preferably $97 \times 10^{-7}/°$ C. or less and more preferably $95 \times 10^{-7}/°$ C. or less.

The glass for chemical toughening treatment according to the present invention has low brittleness, and does not easily undergo a cracking during handling. Specifically, when a brittleness evaluation is conducted according to the procedures described in the Examples below, the load at which a cracking rate reaches 50% or more is 0.1 kgf or more.

From the view point of using the glass after a chemical toughening treatment in applications such as cover glass, the glass for chemical toughening treatment according to the present invention has a specific gravity measured at room temperature of preferably 2.55 or less.

The glass for chemical toughening treatment of the present invention has the specific gravity of more preferably 2.52 or less and further preferably 2.50 or less. It becomes difficult to alter the composition if the specific gravity greatly differs from 2.49 of commonly known soda line silicate in the case where the composition is changed from the commonly known soda lime silicate glass in facilities of continuously producing a glass plate in such a manner of a floating method or an overflow downdraw method. Therefore, the specific gravity is preferably 2.40 or more, more preferably 2.42 or more, and further preferably 2.44 or more.

The glass for chemical toughening treatment according to the present invention has excellent chemical toughening characteristics, as described below.

In order to reduce the influence of scratches that occur during processing, it is preferable that a principal surface of a glass after a chemical toughening treatment (hereinafter, referred to as "chemically toughened glass"), on which the chemical toughening treatment has been performed, has a depth of surface compressional stress layer (DOL) of 8 μm or more in the case where the principal surface of the glass for chemical toughening treatment according to the present invention is subjected to the chemical toughening treatment. The chemically toughened glass according to the present invention has the DOL of more preferably 9 μm or more.

On the other hand, for ease of cutting after chemical toughening, the chemically toughened glass of the present invention has the DOL of preferably 25 μm or less, more preferably 20 μm or less, and further preferably 18 μm or less.

The DOL can be evaluated by using a commercially available surface stress meter.

In order to reduce the chance of fracture upon dropping or bending of the glass, it is preferable that the chemically toughened glass according to the present invention has a surface compressional stress (CS) of 300 MPa or more in the principal surface subjected to a chemical toughening treatment. The chemically toughened glass of the present invention has the CS of more preferably 500 MPa or more, further preferably 600 MPa or more, and particularly preferably 700 MPa or more.

The CS can be evaluated by using a commercially available surface stress meter.

In the case where the use application of the chemically toughened glass of the present invention is a cover glass for mobile devices, it is preferred that the DOL is 20 μm or more and the CS is 550 MPa or more.

In the present invention, the chemical toughening treatment can be performed by dipping the above-described glass for chemical toughening treatment in molten nitrate of from 400° C. to 465° C. for a predetermined time period. As the molten nitrate, potassium nitrate ($KNO_3$) may be used for example. The chemical toughening treatment time is not particularly limited, and is typically about 1 to 12 hours. In order to make the CS higher, it is preferable to use potassium nitrate having low concentrations of impurities such as sodium nitrate.

Specifically, the concentration of sodium nitrate in potassium nitrate is preferably 3 mass % or less and more preferably 1 mass % or less. However, the concentration of sodium nitrate in potassium nitrate should preferably be 0.05 mass % or more and more preferably 0.1 mass % or more because an excessively low sodium nitrate concentration tends to produce different CS values between chemical toughening batches.

The chemical toughening treatment time is preferably 8 hours or less and preferably 6 hours or less because stress relaxation decreases CS as the chemical toughening treatment time increases. A chemical toughening treatment time of less than 1 hour may result in a small DOL, and the desired strength may not be obtained. It is preferably 1.5 hours or more and more preferably 2 hours or more. Additives may be added to potassium nitrate as appropriate for the purpose of promoting chemical toughening, or for the purpose of improving quality.

The chemical toughening treatment is not necessarily required to be applied to all surfaces of the glass for chemical toughening treatment. For example, only the desired surface(s) of the glass for chemical toughening treatment (e.g., one of the principal surfaces) may be subjected to a chemical toughening treatment in such a manner that the chemical toughening treatment is carried out after masking some surfaces (e.g., five surfaces) of the glass for chemical toughening treatment.

EXAMPLE

The present invention is described below in more detail with reference to Examples. The present invention, however, is not limited thereto. Examples 1 to 9 represent inventive examples. Examples 10 to 26 represent comparative examples. Example 12 represents a common soda lime silicate glass.

In Examples 1 to 26, commonly used raw glass materials such as oxides, hydroxides, carbonates, or nitrates were appropriately selected to make compositions in the mass percentages shown for each component from $SiO_2$ to $K_2O$, and were weighed to make a 900-g glass. The raw material mixture was then placed in a platinum crucible, fed to a resistance heating electric furnace at 1,600° C., and melted for 4 hours to degas and homogenize the glass.

The molten glass obtained was poured into a mold, and maintained at a temperature of Tg+30° C. for 1 hour, followed by cooling to room temperature at a rate of 1° C./min to obtain a glass block. The glass block was cut and ground, and finally mirror-finished on both surfaces to obtain a 1 mm-thick plate-shaped glass measuring 20 mm×20 mm in size (glass for brittleness evaluation, and glass for chemical toughening). Specific gravity, Tg, $T_2$, and $T_4$ were measured by using the methods below. The results are presented in Tables 1 to 3. In the tables, "wt %" means "weight %", and is synonymous with "mass %".

Specific Gravity:
  The Archimedes Method
Glass Transition Point Tg:
  TMA Method
CTE:
  The average coefficient of linear thermal expansion at from 50 to 350° C. was measured according to JIS R 1618:2002 at a temperature increase rate of 5° C./min by using a thermal dilatometer (TD5000SA, manufactured by Bruker AXS), simultaneously with the measurement of glass transition point (Tg).

Temperature $T_2$ and $T_4$:

A glass sample is melted, and the viscosity of the molten glass is measured with a rotary viscometer. The temperature at which the viscosity reaches $10^2$ dPa·s was taken as T2 (° C.), and the temperature at which the viscosity reaches $10^4$ dPa·s was taken as $T_4$ (° C.).

Brittleness Evaluation:

A Vickers indenter is pressed against a glass sample surface under predetermined loads (0.05 kgf, 0.1 kgf, 0.2 kgf) for 15 seconds in an atmosphere with a temperature of 22° C. and a moisture dew point of −1° C. Removing the Vickers indenter leaves a rhomboidal impression formed on the sample surface. After 15 seconds from the completion of pressing, the four corners of the impression are observed, and checked for the number of cracks that occurred at each corner. The pressing of the Vickers indenter and the observation of crack numbers are repeated ten times, and the average number of cracks occurred per pressing of the Vickers indenter is calculated. The number is then divided by the number of corners, 4. When the average number of cracks occurred per pressing is 2, the probability of cracking is 50%. The brittleness is determined to be "Good" when the maximum load that yields a cracking rate of 50% or less is 0.1 kgf or more, and the brittleness is determined to be "Poor" when the maximum load that yields a cracking rate of 50% or less is less than 0.1 kgf.

FIG. 1 is a graph representing the relationship between MgO/RO and RO, and the relationship with the results of brittleness evaluation in Examples. As can be seen in FIG. 1, the brittleness is "Good" in the cases where RO≤15× MgO/RO−3 is satisfied (cases where 15×MgO/RO−RO≥3 is satisfied), and the brittleness is "Poor" in the cases where RO≤15×MgO/RO−3 is not satisfied (cases where 15×MgO/ RO−RO≥3 is not satisfied).

The plate-shaped glass samples obtained according to the foregoing procedures were subjected to chemical toughening treatments according to the following procedures.

(Chemical Toughening Treatment 1)

The chemical toughening treatment was performed by dipping the entirety of the glass sample in molten potassium nitrate at 425° C. for 150 minutes. The concentration of sodium nitrate in the molten potassium nitrate is 2.2%.

The glass sample after the chemical toughening treatment was measured for DOL and CS by using a surface stress meter (FSM-6000 manufactured by Orihara Manufacturing Co., Ltd.).

(Chemical Toughening Treatment 2)

Evaluation of Relationship Between Ion Exchange Rate and Stress Relaxation in Chemical Toughening Treatment:

As for the glass samples in Examples 1 to 10 and Examples 12 and 13, the chemical toughening treatment was performed by dipping the entirety of the glass sample in 100% molten potassium nitrate in temperatures ranging from 375° C. to 450° C. for 6 hours. The glass sample after the chemical toughening treatment was measured for DOL and CS. FIG. 2 is a graph representing the relationship between the CS and DOL of these glass samples. FIG. 2 provides an index of the ion exchange rate of chemical toughening treatment, and chemical toughening characteristics. Toward the upper right corner in FIG. 2, the ion exchange rate of chemical toughening treatment becomes faster and the chemical toughening characteristics becomes more excellent as stress relaxation becomes smaller. The glass samples of inventive examples (Examples 1 to 9) have faster ion exchange rates of chemical toughening treatment and smaller stress relaxation than comparative examples (Examples 10 and 12), and accordingly have excellent chemical toughening characteristics. When varying chemical toughening treatment temperature, the cases where a chemical toughening treatment temperature that yielded a CS of 550 MPa or more and a DOL of 20 μm or more exists are evaluated as "Good", and the cases where such a chemical toughening treatment temperature does not exist are evaluated as "Poor". It can be seen that the results are poor in Example 10 that has a low Tg of 520° C. or lower and is susceptible to stress relaxation, and in Example 12 that has a slow ion exchange rate with an $Al_2O_3$ content of 2% or less.

TABLE 1

| wt % | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| $SiO_2$ | 68.0 | 76.0 | 67.8 | 74.0 | 68.1 | 73.3 | 71.9 | 72.4 | 72.0 |
| $Al_2O_3$ | 5.9 | 2 | 8 | 2 | 5.9 | 4 | 5 | 2.2 | 4 |
| MgO | 9.0 | 5.5 | 9 | 7 | 9.5 | 5 | 6 | 7 | 5 |
| CaO | 1.0 | 2 | 0.5 | 1 | 0.3 | 0.7 | 0.1 | 0.9 | 1.5 |
| SrO | 0.0 | 0 | 0 | 0 | 0.0 | 0 | 0 | 0 | 0 |
| BaO | 0.0 | 0 | 0 | 0 | 0.0 | 0 | 0 | 0 | 0 |
| $ZrO_2$ | 0.0 | 0 | 0 | 0 | 0.0 | 0 | 0 | 1 | 1 |
| $Na_2O$ | 16.1 | 14.5 | 14.7 | 16 | 16.1 | 17 | 16 | 14.5 | 14.5 |
| $K_2O$ | 0.0 | 0 | 0 | 0 | 0.0 | 0 | 1 | 2 | 2 |
| RO | 10.00 | 7.50 | 9.50 | 8.00 | 9.81 | 5.70 | 6.10 | 7.90 | 6.50 |
| 15 * MgO/RO − RO | 3.50 | 3.50 | 4.71 | 5.13 | 4.77 | 7.46 | 8.65 | 5.39 | 5.04 |
| Chemical toughening treatment 1 | | | | | | | | | |
| CS (MPa) | 761 | 531 | 807 | 539 | 766 | 571 | 584 | 566 | 542 |
| DOL (μm) | 15.1 | 16.9 | 14.1 | 19.4 | 15.4 | 20.7 | 21.8 | 18.2 | 20.3 |
| Specific gravity | 2.47 | 2.42 | 2.46 | 2.43 | 2.46 | 2.40 | 2.41 | 2.43 | 2.43 |
| Tg (° C.) | 580 | 546 | 605 | 541 | 588 | 530 | 543 | 541 | 544 |
| $T_2$ (° C.) | 1,492 | 1,543 | 1,548 | 1,500 | 1,493 | 1,528 | 1,539 | 1,506 | 1,540 |
| $T_4$ (° C.) | 1,085 | 1,093 | 1,124 | 1,066 | 1,081 | 1,076 | 1,091 | 1,079 | 1,097 |
| Maximum load yielding cracking rate of 50% or more (kgf) | 0.1 | 0.1 | 0.2 | 0.1 | 0.1 | 0.1 | 0.1 | 0.1 | 0.1 |

TABLE 1-continued

| wt % | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Chemical toughening treatment 2 | | | | | | | | | |
| CS ≥550 MPa, CS ≥20 μm | Good | Good | Good | Good | Good | Good | Good | Good | Good |
| CTE (×10$^{-7}$/° C.) | 93.0 | 82.5 | 85.0 | 91.0 | 88.1 | 81.9 | 78.3 | 77.0 | 76.2 |

TABLE 2

| wt % | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| SiO$_2$ | 77.6 | 60.9 | 71.8 | 68.33 | 67.8 | 67.7 | 67.4 | 67.0 | 66.7 |
| Al$_2$O$_3$ | 3.4 | 12.8 | 1.89 | 5 | 5.9 | 5.9 | 5.9 | 5.8 | 5.8 |
| MgO | 2.7 | 6.7 | 4.62 | 4.13 | 8.2 | 7.7 | 6.7 | 5.3 | 3.8 |
| CaO | 0 | 0.1 | 7.8 | 7 | 2.0 | 2.7 | 4.0 | 6.0 | 8.0 |
| SrO | 0 | 0.2 | 0 | 0 | 0.0 | 0.0 | 0.0 | 0.0 | 0.0 |
| BaO | 0 | 0.2 | | | 0.0 | 0.0 | 0.0 | 0.0 | 0.0 |
| ZrO$_2$ | 0 | 1 | 0 | 0 | 0.0 | 0.0 | 0.0 | 0.0 | 0.0 |
| Na$_2$O | 13.6 | 12.2 | 13.3 | 15 | 16.1 | 16.0 | 16.0 | 15.9 | 15.8 |
| K$_2$O | 1.8 | 5.9 | 0.31 | 0.12 | 0.0 | 0.0 | 0.0 | 0.0 | 0.0 |
| RO | 2.70 | 7.20 | 12.42 | 11.13 | 10.26 | 10.43 | 10.77 | 11.27 | 11.76 |
| 15 * MgO/RO − RO | 12.30 | 6.76 | −6.84 | −5.56 | 1.78 | 0.70 | −1.37 | −4.25 | −6.91 |
| Chemical toughening treatment 1 | | | | | | | | | |
| CS (MPa) | 395 | 717 | 542 | 634 | 742 | 738 | 730 | 719 | 707 |
| DOL (μm) | 25.3 | 33.2 | 6.0 | 9.0 | 13.3 | 12.6 | 11.3 | 9.2 | 73 |
| Specific gravity | 2.40 | 2.48 | 2.49 | 2.50 | 2.48 | 2.48 | 2.49 | 2.51 | 2.52 |
| Tg (° C.) | 515 | 604 | 557 | 556 | 569 | 569 | 564 | 562 | 564 |
| T$_2$ (° C.) | 1,680 | 1,601 | 1,447 | 1,455 | 1,480 | 1,475 | 1,464 | 1,449 | 1,434 |
| T$_4$ (° C.) | 1,120 | 1,176 | 1,039 | 1,042 | 1,069 | 1,064 | 1,055 | 1,042 | 1,028 |
| Maximum load yielding cracking rate of 50% or more (kgf) | 0.1 | 0.1 | 0.05 | 0.05 | 0.05 | 0.05 | 0.05 | 0.05 | 0.05 |
| Chemical toughening treatment 2 | | | | | | | | | |
| CS ≥550 MPa, CS ≥20 μm | Poor | | Poor | Good | | | | | |
| CTE (×10$^{-7}$/° C.) | 82.0 | 98.0 | 88.0 | 92.0 | 92.7 | 92.2 | 93.1 | 89.3 | 94.8 |

TABLE 3

| wt % | Ex. 19 | Ex. 20 | Ex. 21 | Ex. 22 | Ex. 23 | Ex. 24 | Ex. 25 | Ex. 26 |
|---|---|---|---|---|---|---|---|---|
| SiO$_2$ | 53.4 | 54.8 | 64.5 | 65.0 | 63.6 | 64.3 | 64.1 | 67.9 |
| Al$_2$O$_3$ | 19.4 | 19.9 | 9.8 | 8.0 | 8.9 | 7.8 | 7.8 | 5.9 |
| MgO | 6.4 | 13.1 | 4.5 | 4.1 | 4.0 | 5.5 | 5.6 | 8.0 |
| CaO | 8.9 | 0.0 | 3.6 | 3.0 | 2.7 | 2.6 | 2.3 | 2.0 |
| SrO | 0.0 | 0.0 | 0.0 | 0.0 | 0.0 | 0.0 | 0.3 | 0.0 |
| BaO | 0.0 | 0.0 | 0.0 | 0.0 | 0.0 | 0.0 | 0.0 | 0.0 |
| ZrO$_2$ | 0.0 | 0.0 | 0.0 | 2.0 | 2.7 | 2.0 | 2.0 | 0.0 |
| Na$_2$O | 11.8 | 12.1 | 17.5 | 17.9 | 18.0 | 15.8 | 15.9 | 16.1 |
| K$_2$O | 0.0 | 0.0 | 0.0 | 0.0 | 0.0 | 2.0 | 2.0 | 0.0 |
| RO | 15.31 | 13.13 | 8.14 | 7.12 | 6.71 | 8.07 | 8.20 | 10.08 |
| 15 * MgO/RO − RO | −9.04 | 1.87 | 0.22 | 1.60 | 2.23 | 2.18 | 2.11 | 1.87 |
| Chemical toughening treatment 1 | | | | | | | | |
| CS (MPa) | 1,049 | 1,109 | 745 | 627 | 751 | 771 | 745 | 743 |
| DOL (μm) | 3.4 | 12.4 | 16.1 | 22.5 | 17.9 | 17.9 | 18.5 | 14.1 |
| Specific gravity | 2.64 | 2.56 | 2.49 | 2.51 | 2.52 | 2.51 | 2.51 | 2.47 |
| Tg (° C.) | 703 | 727 | 563 | 538 | 569 | 563 | 563 | 570 |
| T$_2$ (° C.) | 1,559 | 1,631 | 1,499 | 1,493 | 1,498 | 1,496 | 1,493 | 1,472 |
| T$_4$ (° C.) | 1,169 | 1,234 | 1,070 | 1,076 | 1,086 | 1,086 | 1,084 | 1,061 |
| Maximum load yielding cracking rate of 50% or more (kgf) | 0.05 | 0.05 | 0.05 | 0.05 | 0.05 | 0.05 | 0.05 | 0.05 |
| Chemical toughening treatment 2 | | | | | | | | |
| CS ≥550 MPa, CS ≥20 μm | | | | | | | | |
| CTE (×10$^{-7}$/° C.) | 86.1 | 80.0 | 99.0 | 101.9 | 95.5 | 101.2 | 97.4 | 93.1 |

As clearly shown in the tables, the glass samples of inventive examples (Examples 1 to 9) all have a temperature $T_2$ of 1,600° C. or lower. They show the maximum load that yields a cracking rate of 50% or less being 0.1 kgf or more, and the brittleness evaluation of "Good". These glass samples have a DOL of 8 μm or more and a CS of 300 MPa or more, show the evaluation of the relationship between ion exchange rate and stress relaxation (chemical toughening treatment 2) being "Good", and show excellent chemical toughening characteristics.

The temperature $T_2$ was higher than 1,600° C. in the glass sample of Example 10 having an MgO content of less than 2 mass % and an $Na_2O$ content of less than 14.5 mass %, and in the glass sample of Example 11 having an $Al_2O_3$ content of more than 10 mass %. The brittleness evaluation was "Poor" in the glass samples of Examples 12 to 26 that did not satisfy 15×MgO/RO−RO≥3.

While the present invention has been described in detail with reference to a certain embodiment, it will be apparent to a skilled person that various changes and modifications may be made thereto without departing from the spirit and scope of the present invention. This patent application is based on Japanese Patent Application (No. 2014-132551) filed on Jun. 27, 2014, the entire contents of which are hereby incorporated by reference.

The invention claimed is:

1. A glass for chemical toughening treatment comprising, in mass % in terms of oxides,
   $SiO_2$ 66 to 76,
   $B_2O_3$ 0 to 2,
   $Al_2O_3$ 2 to 7,
   MgO 2 to 12,
   CaO 0.1 to 8,
   $Na_2O$ 14.5 to 19,
   $K_2O$ 0 to 2, and
   $Fe_2O_3$ 0 to 0.5,
   satisfying a total content of alkaline earth metal oxides (RO) being from 5 to 15,
   satisfying 15×MgO/RO−RO≥3, and
   having a temperature $T_2$ at which a glass viscosity reaches $10^2$ dPa·s being 1,570° C. or lower.

2. The glass for chemical toughening treatment according to claim 1, satisfying MgO/RO being 0.5 or more.

3. The glass for chemical toughening treatment according to claim 1, satisfying, in mass % in terms of an oxide,
   $SiO_2$ 66 to 73,
   MgO 6 to 10, and
   CaO 0.3 to 5.

4. A chemically toughened glass in which a chemical toughening treatment is carried out on at least one principal surface of the glass for chemical toughening treatment described in claim 1.

5. The chemically toughened glass according to claim 4, wherein the principal surface subjected to the chemical toughening treatment has a depth of surface compressional stress layer (DOL) of 8 μm or more and a surface compressional stress (CS) of 300 MPa or more.

6. The chemically toughened glass according to claim 4, wherein the principal surface subjected to the chemical toughening treatment has a depth of surface compressional stress layer (DOL) of 20 μm or more and a surface compressional stress (CS) of 550 MPa or more.

7. The glass for chemical toughening treatment according to claim 1, satisfying, in mass % in terms of an oxide,
   $Al_2O_3$ 2 to less than 7.

8. The glass for chemical toughening treatment according to claim 7, satisfying, in mass % in terms of an oxide,
   $Al_2O_3$ 2 to 5.9.

9. A glass for chemical toughening treatment comprising, in mass % in terms of oxides,
   $SiO_2$ 63 to 76,
   $B_2O_3$ 0 to 2,
   $Al_2O_2$ to less than 7,
   MgO 2 to 12,
   CaO 0.1 to 8,
   $Na_2O$ 14.5 to 19,
   $K_2O$ 0 to 2, and
   $Fe_2O_3$ 0 to 0.5,
   satisfying a total content of alkaline earth metal oxides (RO) being from 5 to 15,
   satisfying 15×MgO/RO−RO≥3, and
   having a temperature $T_2$ at which a glass viscosity reaches $10^2$ dPa·s being 1,570° C. or lower.

10. The glass for chemical toughening treatment according to claim 9, satisfying MgO/RO being 0.5 or more.

11. The glass for chemical toughening treatment according to claim 9, satisfying, in mass % in terms of an oxide,
    $SiO_2$ 63 to 73,
    MgO 6 to 10, and
    CaO 0.3 to 5.

12. A chemically toughened glass in which a chemical toughening treatment is carried out on at least one principal surface of the glass for chemical toughening treatment described in claim 9.

13. The chemically toughened glass according to claim 12, wherein the principal surface subjected to the chemical toughening treatment has a depth of surface compressional stress layer (DOL) of 8 μm or more and a surface compressional stress (CS) of 300 MPa or more.

14. The chemically toughened glass according to claim 12, wherein the principal surface subjected to the chemical toughening treatment has a depth of surface compressional stress layer (DOL) of 20 μm or more and a surface compressional stress (CS) of 550 MPa or more.

15. The glass for chemical toughening treatment according to claim 9, satisfying, in mass % in terms of an oxide,
    $SiO_2$ 66 to 76.

16. The glass for chemical toughening treatment according to claim 15, satisfying, in mass % in terms of an oxide,
    $Al_2O_3$ 2 to 5.9.

* * * * *